United States Patent
Rusch

(10) Patent No.: US 8,973,531 B2
(45) Date of Patent: Mar. 10, 2015

(54) AUTOMATED CONTINUOUS ZOOPLANKTON CULTURE SYSTEM

(75) Inventor: Kelly A. Rusch, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 367 days.

(21) Appl. No.: 13/315,936

(22) Filed: Dec. 9, 2011

(65) Prior Publication Data

US 2012/0312243 A1  Dec. 13, 2012

Related U.S. Application Data

(60) Provisional application No. 61/421,494, filed on Dec. 9, 2010.

(51) Int. Cl.
| | | |
|---|---|---|
| *A01K 61/00* | (2006.01) | |
| *A01H 13/00* | (2006.01) | |
| *A01G 7/00* | (2006.01) | |
| *A01K 29/00* | (2006.01) | |

(52) U.S. Cl.
CPC ............. *A01K 61/005* (2013.01); *A01K 29/005* (2013.01)
USPC .............. 119/207; 47/1.4; 435/42; 435/288.7

(58) Field of Classification Search
CPC ....... A01K 61/00; A01K 61/06; A01H 13/00; A01G 7/00
USPC ............. 47/1.4; 119/200, 204, 207, 209, 211; 435/3, 42, 43, 252.4, 257.1, 257.6, 435/284, 286, 289, 313, 315, 316, 813, 819
See application file for complete search history.

(56) References Cited

U.S. PATENT DOCUMENTS

| | | | | |
|---|---|---|---|---|
| 2,656,508 | A | * | 10/1953 | Coulter ........................ 324/71.1 |
| 3,520,081 | A | * | 7/1970 | Horning et al. ............. 435/257.1 |
| 3,955,318 | A | * | 5/1976 | Hulls ................................ 47/1.4 |
| 4,084,346 | A | * | 4/1978 | Stengel et al. ............. 435/292.1 |
| 4,320,594 | A | * | 3/1982 | Raymond ......................... 47/1.4 |
| 4,324,068 | A | * | 4/1982 | Anthony ........................... 47/1.4 |
| 4,473,970 | A | * | 10/1984 | Hills ................................. 47/1.4 |
| 4,658,757 | A | * | 4/1987 | Cook ............................. 119/233 |
| 4,695,384 | A | * | 9/1987 | Ripl et al. ...................... 210/602 |
| 5,158,037 | A | * | 10/1992 | Engelbart ...................... 119/226 |
| 5,543,329 | A | * | 8/1996 | Bedell ........................... 435/7.32 |
| 5,614,378 | A | * | 3/1997 | Yang et al. ....................... 435/41 |
| 5,801,050 | A | * | 9/1998 | Uchida et al. .............. 435/257.1 |
| 6,037,170 | A | * | 3/2000 | Sekine ......................... 435/292.1 |
| 6,083,740 | A | * | 7/2000 | Kodo et al. .................... 435/266 |
| 6,228,136 | B1 | * | 5/2001 | Riley et al. .......................... 71/6 |
| 6,348,347 | B1 | * | 2/2002 | Hirabayashi et al. ...... 435/292.1 |

(Continued)

*Primary Examiner* — Rob Swiatek
*Assistant Examiner* — Morgan T. Barlow
(74) *Attorney, Agent, or Firm* — Jason P. Mueller; Adams and Reese LLP

(57) ABSTRACT

A system and method for determining the concentration of zooplankton in a continuous zooplankton culture system. The system may include a transmissiometer, a sample tube, a first sample containing water and microalgae, and a second sample containing water, microalgae, and zooplankton. The concentration of zooplankton in the system may be calculated by comparing the transmissiometer output from the first sample and the second sample, wherein each of the outputs are obtained by moving each sample into the sample tube such that the transmissionmeter is positioned to take a reading across the tube.

16 Claims, 6 Drawing Sheets

(56) References Cited

U.S. PATENT DOCUMENTS

| | | | |
|---|---|---|---|
| 6,509,178 B1* | 1/2003 | Tanaka et al. | 435/134 |
| 6,572,770 B1* | 6/2003 | Stewart et al. | 210/602 |
| 6,579,714 B1* | 6/2003 | Hirabayashi et al. | 435/292.1 |
| 6,936,459 B1* | 8/2005 | Venkatesh et al. | 435/257.1 |
| 6,986,323 B2 | 1/2006 | Ayers | 119/200 |
| 7,397,232 B2* | 7/2008 | Hu et al. | 324/71.4 |
| 7,479,167 B2* | 1/2009 | Markels, Jr. | 44/307 |
| 7,585,898 B2* | 9/2009 | Thothathri | 516/80 |
| 7,618,813 B2* | 11/2009 | Lee et al. | 435/292.1 |
| 7,682,821 B2* | 3/2010 | Woods et al. | 435/292.1 |
| 7,740,753 B2* | 6/2010 | Abe et al. | 210/87 |
| 7,824,904 B1* | 11/2010 | Dimanshteyn | 435/292.1 |
| 7,824,905 B2* | 11/2010 | Shvabsky et al. | 435/292.1 |
| 7,972,768 B1* | 7/2011 | St.Lawrence | 435/3 |
| 7,985,267 B2* | 7/2011 | Markels, Jr. | 44/307 |
| 8,017,377 B1* | 9/2011 | Much | 435/257.1 |
| 8,043,847 B2* | 10/2011 | Hobbs et al. | 435/292.1 |
| 8,076,121 B2* | 12/2011 | O'Rear | 435/262.5 |
| 8,076,122 B2* | 12/2011 | O'Rear | 435/262.5 |
| 8,202,699 B2* | 6/2012 | Hegemann et al. | 435/7.21 |
| 8,470,246 B2* | 6/2013 | Rich | 422/67 |
| 2003/0073231 A1* | 4/2003 | Dutil | 435/292.1 |
| 2004/0121447 A1* | 6/2004 | Fournier | 435/257.1 |
| 2005/0070008 A1* | 3/2005 | Wong et al. | 435/257.1 |
| 2006/0207168 A1* | 9/2006 | Harper | 47/1.4 |
| 2007/0155006 A1* | 7/2007 | Levin | 435/292.1 |
| 2007/0205148 A1* | 9/2007 | Jones et al. | 210/601 |
| 2007/0289206 A1* | 12/2007 | Kertz | 47/1.4 |
| 2008/0011679 A1* | 1/2008 | Champagne et al. | 210/637 |
| 2008/0213868 A1* | 9/2008 | Fournier | 435/257.1 |
| 2008/0274494 A1* | 11/2008 | Kertz | 435/29 |
| 2009/0126265 A1* | 5/2009 | Rasmussen et al. | 47/1.4 |
| 2009/0137031 A1* | 5/2009 | Hirabayashi | 435/292.1 |
| 2009/0148931 A1* | 6/2009 | Wilkerson et al. | 435/286.1 |
| 2009/0151240 A1* | 6/2009 | Kayama et al. | 47/1.4 |
| 2009/0151241 A1* | 6/2009 | Dressler et al. | 47/1.4 |
| 2009/0301399 A1* | 12/2009 | Brown et al. | 119/226 |
| 2010/0005711 A1* | 1/2010 | McNeff | 47/1.4 |
| 2010/0120104 A1* | 5/2010 | Reed | 435/140 |
| 2010/0189806 A1* | 7/2010 | Harper et al. | 424/601 |
| 2010/0269760 A1* | 10/2010 | Cibuzar | 119/234 |
| 2010/0300962 A1* | 12/2010 | Semenza | 210/602 |
| 2011/0131880 A1* | 6/2011 | Kloas et al. | 47/62 R |
| 2012/0034679 A1* | 2/2012 | Falber | 435/257.1 |
| 2012/0058542 A1* | 3/2012 | Wu et al. | 435/257.1 |
| 2012/0312243 A1* | 12/2012 | Rusch | 119/204 |
| 2013/0152864 A1* | 6/2013 | Grajcar et al. | 119/204 |

\* cited by examiner

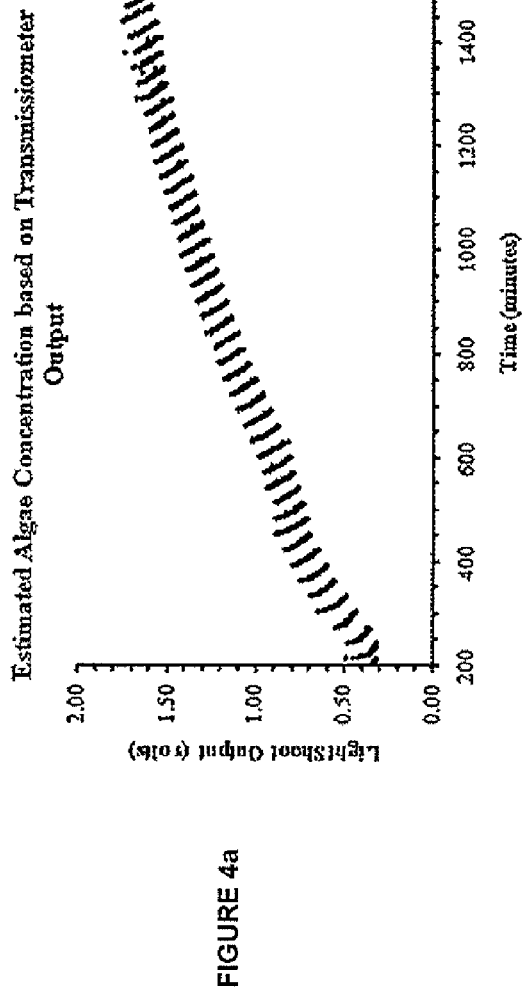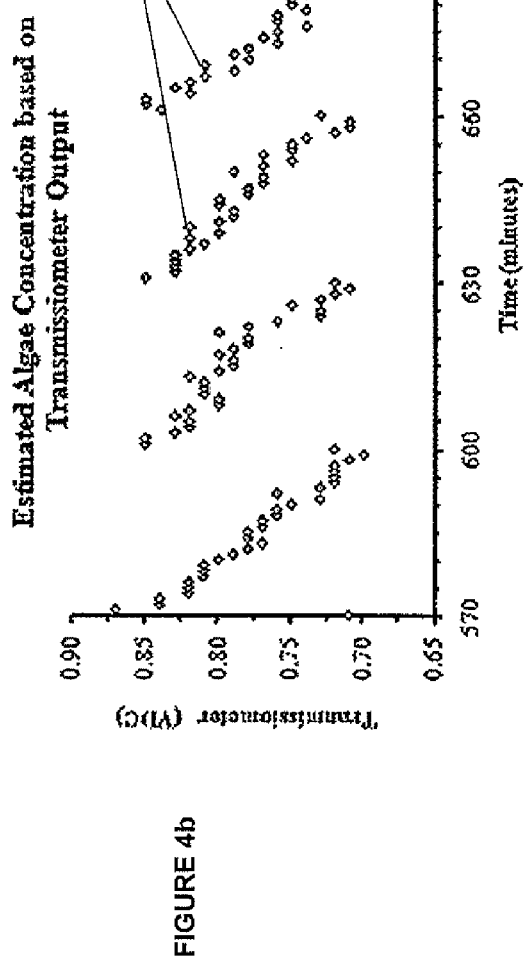
FIGURE 4a
FIGURE 4b

AUTOMATED CONTINUOUS ZOOPLANKTON CULTURE SYSTEM

CROSS REFERENCE TO RELATED APPLICATIONS

This application claims the benefit of U.S. Provisional Patent Application Ser. No. 61/421,494 filed on Dec. 9, 2010 which is expressly incorporated herein in its entirety by reference thereto.

FIELD

The present invention relates generally to the field of in process measurement of suspended particle density in a process fluid, and in a specific, though non-limiting, embodiment to the in-process measurement of zooplankton density in an automated, continuous zooplankton culture system for the marine aquaculture industry.

BACKGROUND

After decades of marine fish culture research, the production of most marine fish species still relies on live-food technology to sustain finfish larvae through the first weeks of life. Zooplankton—microscopic and semi-microscopic invertebrate animals existing in fresh, brackish and seawater—are frequently used as such live food. In addition to rotifers [Phylum Rotifera] several other types of zooplankton, particularly those of the free swimming genus, may be used to sustain finfish larvae through the first weeks of life, such as Sub-Phylum Crustacea, order Cladoceran (e.g., *Moina* sp., *Daphnia* sp.), Sub-Phylum Crustacea, sub-class Copepoda (e.g., Cyclops), and Brine shrimp (*Anemia* sp.). Efficient production of zooplankton, however, limits the commercialization of marine finfish.

Unlike freshwater finfish, the larval stage of many marine species of commercial interest are small and require small foods with sustained production to rear the larvae through the critical early stage. Thus, because marine finfish larvae require live feeds from the first week to about one month of their existence, there is a current need for very small live food in marine fish larviculture.

The zooplankton *B. rotundiformis* is an example of one such live food, but in order to serve as a viable option for many marine finfish larvae, the rotifers must be of the S or SS-types, that is, with Loric lengths from 160 micrometers down to less than 100 micrometers. The inability to supply microalgal/zooplankton feed in a consistent, cost effective manner continues to be a limitation to the expansion of the marine aquaculture industry.

The primary technologies available in the aquaculture industry for the culturing of zooplankton rely on batch processing methods. Batch process cultures are harvested only once before beginning the culture cycle again, thus necessitating redundant systems to ensure a continuous zooplankton supply and thereby increasing the equipment footprint and labor needs. Further, because batch cultures are grown to maximum standing crop prior to harvest, stability of the culture becomes an issue, often resulting in high frequency of culture collapse. Finally, the consistency and quality of batch processed zooplankton cultures can be highly variable. While semi-continuous culture systems are an improvement over batch culture systems, they remain primarily manually operated and thus labor-intensive. Therefore, an automated, continuous zooplankton culture system will fill a need in the aquaculture industry.

In order for such an automated, continuous culture system to function with reasonable efficiency, it is necessary to determine, in-process, the concentration or density of zooplankton present in the system. In order to properly control the growth of the organism in a computer-supervised system, for example, information on the zooplankton's density in the culture water must be passed to a control unit. In the past, this density has been determined by such means as a turbidity measurement, machine vision methods, hemocytometry, or manual counts under a microscope. These methods are costly to implement, require frequent instrument calibration and/or cleaning, may require large amounts of human effort/time, and are impractical for an application wherein this information is needed on a real-time basis.

Thus, for a device and/or method for determining the concentration of suspended particles, such as zooplankton, to be both economical and practical for a process control system, it must circumvent the above factors to in order to allow the control system to automate the process to its fullest possible potential with minimal control required on the process water itself and minimal maintenance time by human operators.

SUMMARY

According to exemplary embodiments of the present invention, a system and method for determining the concentration of zooplankton in a continuous zooplankton culture system are provided. Such a system may include a light-sensing device, such as a transmissiometer, having a light source and a photovoltaic cell positioned on opposite sides of a sample tube. A first sample containing water and microalgae may be moved into the sample tube and the output of the photovoltaic cell recorded as a first signal. A second sample containing water, microalgae, and zooplankton may be moved into the sample tube and the output of the photovoltaic cell recorded as a second system. The concentration of the zooplankton may then be calculated by determining the mathematical difference between the first and second systems.

BRIEF DESCRIPTION OF THE DRAWINGS

FIGS. 4a and 4b are plots of data sets output from a system for monitoring the concentration of zooplankton in a zooplankton culture system, according to an exemplary embodiment of the present invention.

DETAILED DESCRIPTION

Figure 1:
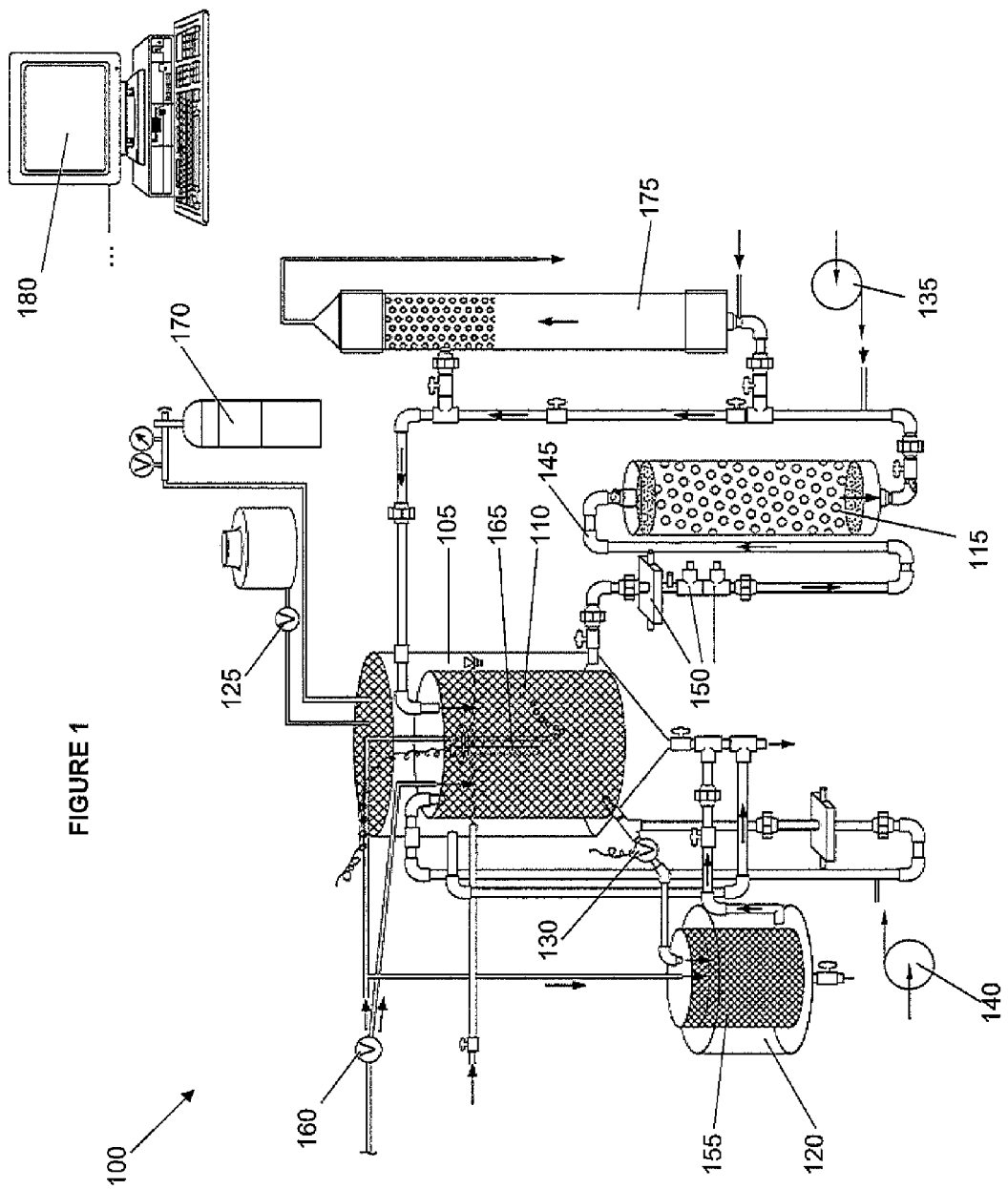
FIG. 1 is a schematic of a zooplankton culture system, according to an exemplary embodiment of the present invention.

According to an exemplary embodiment of the present invention, an automated, continuous zooplankton culture system may include: a culture reactor, which in certain embodiments may be a coned bottom culture tank, a screening system configured to keep the rotifers within the reactor, a harvesting system, a biofiltration system, and a control system. Other embodiments may further include at least one air-lift pump, a water reservoir tank, an algal feeding unit, a pH adjustment unit and an emergency oxygen dosing unit FIG. 1 illustrates zooplankton culture system 100 according to an exemplary embodiment of the present invention. Rotifers/zooplankton are maintained inside of culture reactor 105. Culture reactor 105 may contain internal screen 110 to maintain the rotifers/zooplankton within the reactor and allowing culture water to circulate throughout the system 100. Screen 110 may be cylindrical in shape and configured such that the screening openings are smaller than the cultured zooplankton such that the zooplankton are retained within cylindrical screen 110, while culture water freely circulates through. As the culture water is circulated through system 100 by one or more pumps, screen 110 maintains the rotifers in reactor 105, but allows microalgae, which may be used to feed the rotifers/zooplankton, into and out of reactor 105. The one or more pumps (not shown) also circulate the culture water through the filtration system 115 for removal of any contaminants. A control system may be used to monitor and/or control certain system parameters and/or conditions, such as, but not limited to, temperature, pH, salinity, oxygen, microalgae (feed) dosing (both amount and periodicity), microalgae and rotifer/zooplankton concentrations and zooplankton harvesting (both amount and periodicity) When the desired rotifer/zooplankton concentration is reached, harvesting tank 120 may be used to extract the rotifer/zooplankton from the system.

In one embodiment, rotifer culture tank 105 may be a 40-L cylindrical, polyethylene tank with a conical bottom (D=15", H=24"). Internal screen 110 may be a 55-µm central cylindrical screen (D=11', H=18") embedded inside of culture tank 105. Screen 110 may thus be configured to retain the rotifers within culture reactor 105, but allow microalgae and culture water to circulate throughout system 100. The effective rotifer culture volume enclosed by 55-µm screen 110 may be up to 19 L. Filtration system 115 may consist of a 15 L column (D=6", H=24") packed with 7.0 L KMT media having a low density, such as 180 kg/m$^3$. The system component dimensions referenced above represent an exemplary embodiment of the present invention. In other embodiments, the dimensions of a culture system and its components may vary based on such factors as desired zooplankton output. In certain embodiments, filtration system 115 may further include passive cleaning mechanisms, such as air scrubbing and air sparging mechanisms, and is configured to maximize the time necessary between manual cleaning/unclogging.

In other embodiments, filtration system 115 may include a cartridge filter, such as a 1-µm polypropylene cartridge filter, to treat water for system 100 to eliminate potential contaminant organisms or their eggs. In other embodiments, the filtration system 115 may include a bead filter, trickling towers, a fluidized sand bed, a moving bed bioreactor, or some combination thereof. Certain embodiments may further include foam fractionator 175 for the removal of organic wastes or other contaminants. Certain embodiments may also include a water reservoir tank, and the gravity flow from said reservoir to the screen of the rotifer culture tank may be controlled by a valve, such as a float valve. Microalgae and NaOH solution may be gravity fed into the rotifer culture tank 105 and also regulated by a valve, such as solenoid valve 125. Another valve, such as a solenoid valve 130, may control rotifer harvest from the rotifer culture reactor to the rotifer harvesting tank. One or more airlift pumps 135 and 140 may be used to circulate water within system 100. Culture water containing only microalgae from between the screening system and the culture tank may be circulated by a first airlift pump 135 through filtration system 115 through pipe 145 wherein monitoring sensors 150 are located. In certain embodiments, pipe 145 may be a "U"-shaped pipe, and monitoring sensors 150 may record such metrics as turbidity, temperature, salinity, and pH. A second airlift pump 140 may circulate rotifer and microalgae water from inside the culture reactor through sensors 150, then back to reactor 105. In certain embodiments, one monitoring sensor unit may be used to delineate both microalgae and zooplankton.

In certain embodiments, rotifer harvesting subsystem may include tank 120 with a mesh screen 155 embedded inside. Mesh screen 155 may be a 55-µm mesh screen (D=6.5", H=6"). While in some embodiments, tank 120 may be a 20-L bucket (D=11", H=14") In other embodiments, tank 120 may include a rugged polyethylene tank with an overflow into a drain sump which contains a section of acrylic pipe with a screened bottom, wherein screen 155 is suspended above the bottom of the tank. In certain embodiments, the acrylic pipe may have a diameter of 6 inches, screen 155 may be a 55 µm mesh, and screen 155 may be suspended at a distance of about one inch above the bottom of the tank. The overflow discharge water level in the tank may be maintained at a level such that the harvested rotifers remain submerged in water. The system component dimensions referenced above represent an exemplary embodiment of the present invention. In other embodiments, the dimensions of a culture system and its components may vary based on such factors as desired zooplankton output.

According to certain embodiments of the present invention, a rotifer culture system 100 may further include a control system 180, which may include both process control and data acquisition systems. The control system may include a microprocessor based control computer for remote control of the system. In certain embodiments, the control system may be developed with the Rugid™ controller framework. The control system may also include a memory device for data storage. In certain embodiments, the memory device is portable and removable, such as a flash memory card, to simplify moving data from the control system to an external computing device, such as a desktop or laptop, for analysis. In certain embodiments, the control system may be configured to monitor a number of system parameters, including microalgae concentration, rotifer/microalgae concentration, pH, temperature, dissolved oxygen and conductivity/salinity. One or more of these parameters may be altered or otherwise controlled by the control system in accordance with a control algorithm stored in the microprocessor. In certain embodiments, based on the monitored parameters and the control algorithm, the control system may be used to manipulate one or more solenoid valves 125, 130, and 160 to control the frequency and duration of microalgal feed, rotifer harvest, and pH-NaOH input. Temperature may be controlled via submerged heater 165, and dissolved oxygen may be modified via oxygen diffuser 170 or, in some embodiments, the aeration provided by airlift pumps 135 and 140 may be used to maintain adequate dissolved oxygen levels.

Figure 2:
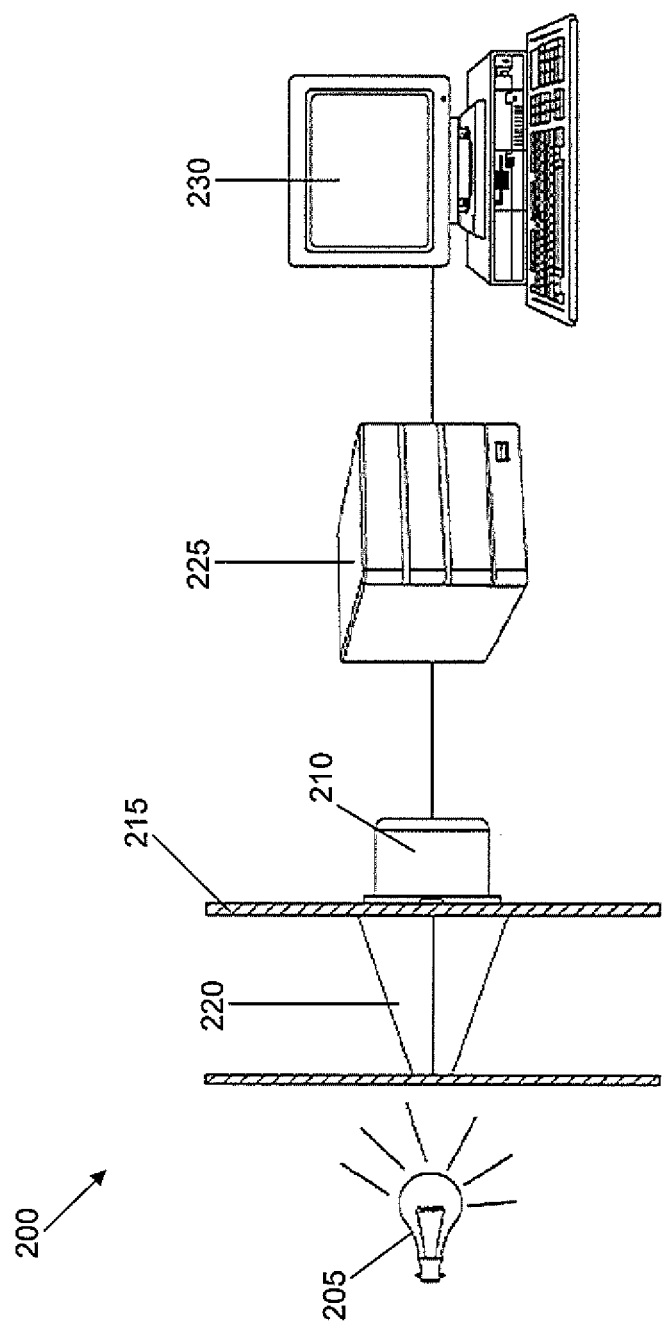
FIG. 2 is a side view of a system for monitoring the concentration of zooplankton in a zooplankton culture system, according to an exemplary embodiment of the present invention.

FIG. 2 illustrates a system for monitoring the zooplankton concentration in a zooplankton culture system according to an exemplary embodiment of the present invention. Monitoring system 200 may include a transmissiometer/transducer having light source 205 and photovoltaic cell 210 positioned on opposite sides of sample tube 215 through which a sample flows via pump. Light source 205 and photovoltaic cell 210 may be position such that photovoltaic cell 210 detects light beam 220 emitted by light source 205 across sample tube 215 as distorted by any sample or substance therein. One or more solenoid valves may be included that direct samples into and out of sample tube 215. In certain embodiments, such samples may include water containing microalgae and/or zooplankton/rotifer and microalgae. The output signal of photovoltaic cell 210 may be recorded/captured by digital storage device 225. According to an exemplary embodiment of the present invention, system 200 may be configured to record a first output signal of photovoltaic cell 210 for a first sample containing an unknown concentration of microalgae, and a second output signal of photovoltaic cell 210 for a second sample containing an unknown concentration of both microalgae and zooplankton, wherein the first and second samples are moved into and out of sample tube 215 via the pump. Microprocessor 230 may be configured to compare first and second output signals as captured by digital storage device 225. In certain embodiments, microprocessor 230 may be configured to compare streams of first and second output signals over time. In certain embodiments, sample tube 215 may be a quartz tube, pump (not shown) may be an airlift pump, and light source 205 may be a wavelength specific (or several wavelength specific) LED light source(s) in conjunction with appropriate phototransisitors. An LED light source 205 and sensor 210 may be powered by an industrial 5 VDC power supply. Thus, microalgae and rotifer/microalgae biomass density estimations may be based on a defined relationship between (and an associated set of control algorithms) the voltage output (0-5 VDC) generated by photovoltaic cell 210 in response to the light output 220 of the light source 205 versus a total suspended solids measurement for the microalgae and a count for the zooplankton. In other embodiments, a 90-degree light scattering sensor may be used. In one such embodiment, the sensor may have a monochromatic light source and an appropriate detector to capture time varying signals that are conditioned by a set of associated algorithms that remove background noise and result in a count of zooplankton. According to one embodiment of the present invention, the control system, through the manipulation of one of two solenoid valves and an airlift pump, may periodically move one sample at a time into sample tube 215. The samples alternate between microalgae containing water, and rotifer/microalgae containing water. The photovoltaic cell 210 output may be sampled regularly, such as once per minute, and the data saved into one of two separate data streams on digital storage device 225, one stream corresponding to microalgae samples, and one corresponding to rotifer/microalgae samples. The two data streams may then be evaluated by an external device, such as a microprocessor 230, which in some embodiments may be a laptop or desktop computer, and the rotifer concentration over time calculated by comparing the microalgae samples to the corresponding rotifer/microalgal samples.

EXPERIMENT #1

As previously stated, monitoring of microalgal concentration is a fundamental control parameter in a continuous process zooplankton culture system. As such a first experiment was performed wherein two LED based transmissiometer/transducers were employed, with the system arranged consistent with FIG. 1 with rotifers as the cultured organism. Water was airlifted to the first transmissiometer/transducer from outside of the screened growth chamber 110 of culture reactor 105 and thus contained only microalgae. A second airlift pump moved water from within the screened growth chamber 110 and thus contained both microalgae and rotifers to a second transmissiometer/transducer. The control concept was that one transmissiometer/transducer would monitor the microalgae concentration and the second the combined microalgae and rotifer concentration. The difference between the two measurements would then be an estimate of the rotifer concentration. Computer control algorithms would then use this value to schedule both microalgae dosing and harvesting frequency of system 100. Although conceptually feasible, it became clear that this concept would not be feasible for long-term management in a commercial system, as there was a significant offset between the outputs of the two transmissiometers and each was very sensitive to LED orientation.

EXPERIMENT #2

Figure 3:
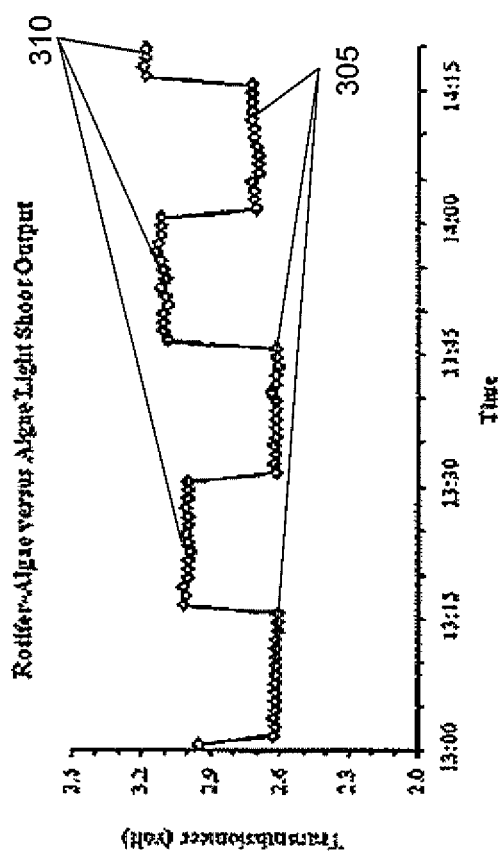
FIG. 3 is plot of a data set output from a system for monitoring the concentration of zooplankton in a zooplankton culture system, according to an exemplary embodiment of the present invention.

Due to the aforementioned difficulties with using two separate transmissiometers as discovered in Experiment #1 above, a decision was made to employ two solenoid valves and a single airlift pump to route the two samples to a single transmissiometer. A new program for the control system was written such that the solenoid valves and airlift pump would alternate samples containing only microalgae and samples containing microalgae and rotifers into the sample tube for measurement by the transmissiometer. The transmissiometer output was sampled every minute and the data stream parsed into two separate data sets (one for the microalgae only samples, and one for the microalgae and rotifer samples). Each of the data sets was stored and averaged over the fifteen minute sampling time. Finally, the two data sets were downloaded onto a flash drive once daily. FIG. 3 shows an example of the data output of the measurement system, according to an exemplary embodiment of the present invention. Data set 305 shows the data output for samples of the microalgae only samples, and data set 310 shows the data output for samples of the microalgae and rotifer samples. FIG. 3 demonstrates that the overall concept of a single transmissiometer worked extremely well, and demonstrates a linear relationship between two data streams. In certain embodiments of the present invention, data sets 305 and 310 are the readings collected from photovoltaic cell 210 in an arrangement consistent with FIG. 2. In such embodiments, one or both of the digital storage device 225 and microprocessor 230 may be part of the system control system.

According to an alternative embodiment of the present invention, rotifer concentration may also be calculated based on a simple transmissiometer measurement of culture water containing both microalgae and rotifers. After each dose of microalgae into the culture system, the rotifers therein feed on the microalgae, significant reducing the microalgae population. Thus, in certain embodiments, the control system may calculate the estimated number of rotifers and their overall health by monitoring the change in the microalgae concentration subsequent to administration of a dose of microalgae feed to the system.

EXPERIMENT #3

An experiment was set up to test an alternative method of estimating rotifer concentration as set forth above. Again, a rotifer culture system consistent with the arrangement of FIG. 1 was used. This alternative method was based on a simple transmissiometer measurement of culture water containing both microalgae and rotifers. FIGS. 4a and 4b illustrate data sets captured as a result of this experiment. As can be seen in these figures, after each dose of microalgae, the rotifers immediately feasted on them thereby significantly reducing the overall microalgae concentration. Accordingly, it was discovered that it is possible to estimate the number of rotifers and their over health by monitoring the transmissiometer output, particularly between microalgae dosing cycles. FIG. 4a demonstrates a period during this experimental trial when the amount of microalgae, which may be in the form of a paste, slurry, or other such concentrated algae suspension, being added was more than the existing population of rotifers could consume and the microalgae concentration slowly increased over time, as demonstrated by the initial upward trend in the transmissiometer output (y-axis). However, after a period of approximately one day, the rotifer population caught up to the increased microalgae dose, as illustrated by the gradual leveling-out of the transmissiometer output.

Accordingly, it was discovered that the culture system rotifer concentration could be estimated as a function of the "thickness" of the data plots for each feeding cycle. For example, in FIG. 4b, each data set 405 represents one feed cycle, wherein an initial "spike" in the transmissiometer output marks the introduction of a microalgae dose to the system, with the transmissiometer output decreasing as the rotifers feed on the microalgae. Accordingly, the rate at which the transmissiometer output decreases, both within a feed cycle and across multiple cycles, indicates the overall rotifer concentration and whether the rotifer reproduction rate is increasing or decreasing. In certain embodiments of the present invention, a turbidity meter may be used in place of the transmissiometer.

Certain embodiments of the present invention may also include methods for harvesting zooplankton from a culture system, wherein the concentration of the zooplankton in the system as determined by any of the methods/systems disclosed herein in an input of such a control system. Such a method may include the steps of:

1) defining a zooplankton concentration setpoint (i.e., a concentration of zooplankton within the culture system that triggers a harvest cycle), a harvest duration, and a harvest gain;
2) calibrating the intercept and slope of the desired concentration curve and the harvest constraints (which may be a minimum and maximum time for rotifer harvest output);
3) reading the zooplankton concentration in the culture system;
4) if the concentration is less than the setpoint, lessening the harvest duration; otherwise, if the zooplankton concentration is equal to or greater than the setpoint, increasing the harvest duration;
5) if the harvest duration is within the defined harvest constraints, harvesting the zooplankton for the harvest duration set in step 4); otherwise, if the harvest duration is not within the harvest constraints, harvesting the zooplankton for the original harvest duration set in step 1);
6) returning to step 3) above, unless the cycle is halted.

In certain embodiments, the zooplankton concentration may be a turbidity measurement, or the output of a transmissiometer or photovoltaic cell as disclosed herein.

Figure 5:
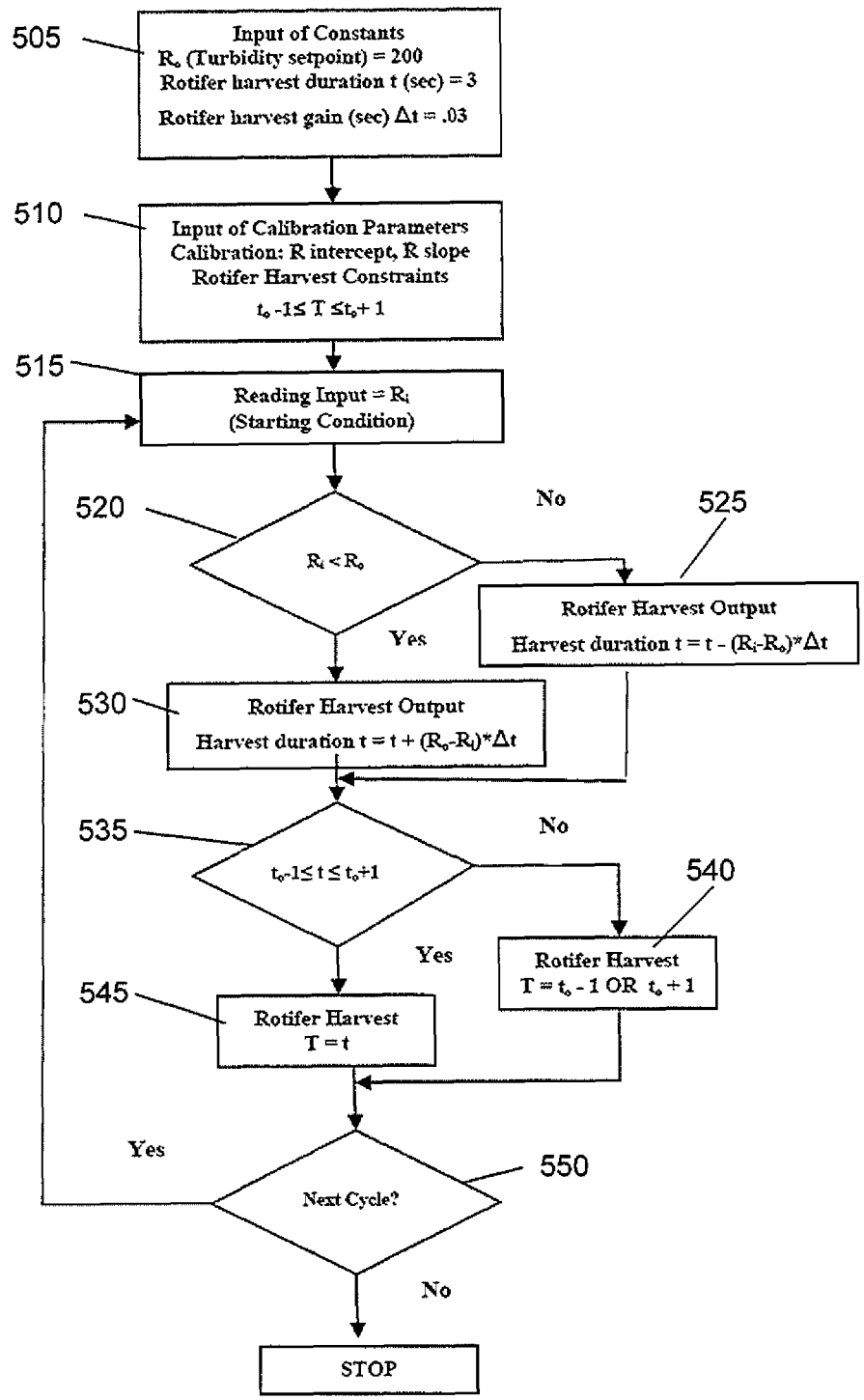
FIG. 5 is a flowchart illustrating a method for harvesting zooplankton from a zooplankton culture system, according to an exemplary embodiment of the present invention.

FIG. 5 is a flowchart illustrating a method for harvesting zooplankton (rotifers) from a zooplankton culture system according to an exemplary embodiment of the present invention. At step 505, the turbidity setpoint is set to 200, the rotifer harvest duration is set to 3 seconds, and the rotifer harvest gain is set to 0.03 seconds. At step 510 the intercept and slope of the desired concentration curve and the harvest constraints (which may be a minimum and maximum time for rotifer harvest output) are calibrated. Turbidity monitoring begins at step 515. At step 520, if the turbidity is less than the setpoint established in step 505, step 530 is executed, wherein the rotifer harvest output duration is increased by the difference between the current turbidity and the setpoint, said difference multiplied by the rotifer harvest gain set in step 505. Otherwise, step 525 is executed, wherein the rotifer harvest duration is decreased by the difference between the current turbidity and the setpoint, said difference multiplied by the rotifer harvest gain set in step 505. If the harvest duration is within the defined harvest constraints (step 535), the zooplankton are harvested for the modified duration set in either 525 or 530, otherwise, the rotifer harvest duration is set to the original duration set in step 505. The method repeats (step 550) until a signal is received to end.

Certain embodiments of an autonomous, continuous zooplankton culture system may be configured to maintain uninterrupted rotifer production for at least sixty to ninety days, and to maintain a density greater than 1,000 to 3,000 rotifers/ml. In some embodiments, rotifers are cultured in artificial seawater, which may be prepared, disinfected, and aged for periodic input into the system to replace water removed during harvesting and lost to evaporation.

Certain embodiments may also include a method for detecting/monitoring algae and rotifer concentrations with a transmissiometer, two solenoid valves, and an airlift pump, a method for detecting/monitoring algae and rotifer concentrations as above, but with a turbidity meter substituted for the transmissiometer and a method for estimation of rotifer concentration based on a transmissiometer measurement of the culture water wherein the change in microalgae concentration following feed dosages is monitored and used to estimate rotifer concentration.

Figure 6:
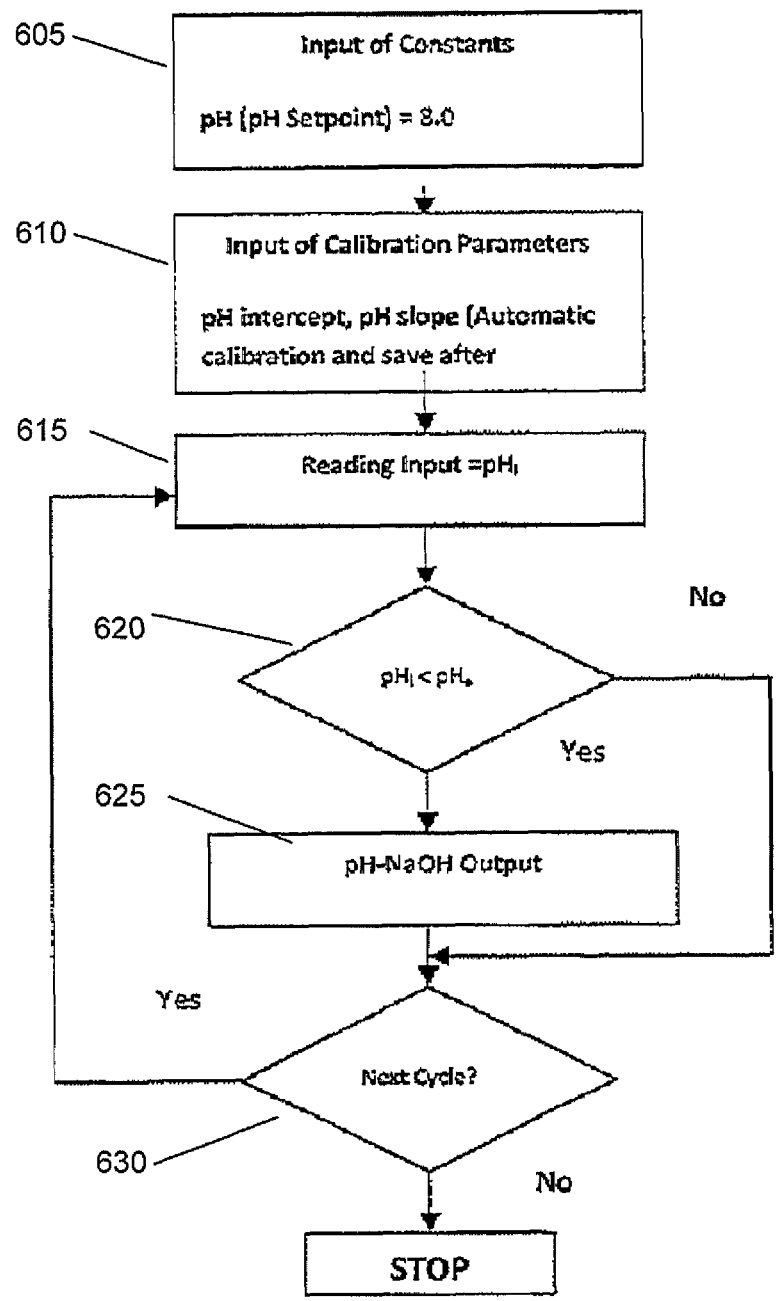
FIG. 6 is a flowchart illustrating a method for controlling the pH of a zooplankton culture system, according to an exemplary embodiment of the present invention.

Certain embodiments of the present invention may also include methods for monitoring and/or controlling the culture system pH, water dosing, air sparge, harvesting, oxygen, etc. For example, FIG. 6 illustrates a method for monitoring and/or controlling the culture system pH, such as the one illustrated in FIG. 1, according to an exemplary embodiment of the present invention. Such a method may include the steps of:

1) defining a pH setpoint (605);
2) calibrating the intercept and slope of the desired pH curve (610);
3) reading the culture system pH via pH sensor or other appropriate means know in the art (615);
4) if the culture system pH is less than the pH setpoint (620), adding a base to the culture system (625);
5) returning (630) to step 620 above, unless the cycle is halted.

According to an exemplary embodiment of the present invention, the pH setpoint may be set to 8, and the base added to the culture system may be sodium hydroxide (NaOH).

An automated, continuous zooplankton culture system may further include several support systems and additional equipment. Certain embodiments of the present invention may include a system to provide a source of disinfected air and water, an oxygen storage unit, manual switches configured to allow a user to manually add water or microalgae feed to the system, and a refrigeration unit configured to maintain the microalgae feed, and a valve situated between the culture tank and the biofilter configured the interrupt the flow therein to allow for cleaning and/or change-out of the screening system.

In some instances, the control system and/or the algorithms disclosed herein may be housed on a server. The server may include a memory, as well as one or more processors, and comprise an electronic computing device operable to receive, transmit, process, store, or manage data associated with the environment. As used in this document, the term "computer" is intended to encompass any suitable processing device. The server may be adapted to execute any operating system including Linux, UNIX, Windows, or any other suitable operating system. According to one implementation, the server may also include or be communicably coupled with a web server and/or a mail server.

Memory may include any memory or database module and may take the form of volatile or non-volatile memory including, without limitation, magnetic media, optical media, random access memory (RAM), read only memory (ROM), removable media, or other suitable local or remote memory component. For example memory may store information that includes any parameters, variables, algorithms, instructions, rules, constraints, or references thereto. The memory may also include any other appropriate data, such as virtual private network (VPN) applications, firmware logs and policies, firewall policies, a security or access log, print or other reporting files, HTML files or templates, and others.

A processor executes instructions and manipulates data to perform the operations of the server and/or algorithms disclosed and may include a central processing unit (CPU), a blade, an application specific integrated circuit (ASIC), or a field-programmable gate array (FPGA). Multiple processors may be used according to particular needs and references to processor are meant to include multiple processors where applicable.

In certain embodiments, one or more of the technologies described herein may communicate across a network. In certain embodiments, these technologies may include an interface for communicating in a client-server or other distributed environment, such as clients or other servers connected to a network. Generally, an interface comprises logic encoded in software and/or hardware in a suitable combination and operable to communicate with the network. More specifically, interface may comprise software supporting one or more communication protocols associated with communications such that the network or hardware is operable to communicate physical signals.

The network may be all or a portion of an enterprise or secured network. In some instances, a portion of the network may be a VPN merely between a server and a client across a wireline or wireless link. Such an example wireless link may be via 802.11a, 802.11b, 802.11g, 802.20, WiMax, or other types of wireless links. In other words, the network encompasses any internal or external network, networks, sub-network, or combination thereof operable to facilitate communications between various computing components in the systems. The network may communicate, for example, Internet Protocol (IP) packets, Frame Relay frames, Asynchronous Transfer Mode (ATM) cells, voice, video, data, and other suitable information between network addresses. The network may include one or more local area networks (LANs), radio access networks (RANs), metropolitan area networks (MANs), wide area networks (WANs), all or a portion of the Internet, and/or any other communication system or systems at one or more locations. In certain embodiments, the network may be a secure network associated with the enterprise and certain local or remote clients.

In certain embodiments, the control system described herein may be accessed by a plurality of users via one or more client devices. Further, "clients," "members," and "user" may be used interchangeably as appropriate without departing from the scope of this disclosure. Moreover, for ease of illustration, each client is described in terms of being used by one user. This disclosure, however, contemplates that more than one user may use one client, or that one user may use multiple clients. As use in this disclosure, the client is intended to encompass a personal computer, touch screen terminal, workstation, network computer, kiosk, wireless data port, smart phone, personal data assistant (PDA), one or more processes within these or other devices, or any other suitable processing device. For example, the client may comprise a computer that includes an input device, such as a keypad, touch screen, mouse, or other device that can accept information and an output device that conveys information associated with the operation of one or more of the technologies described herein or the clients, including digital data, visual information, or the GUI. Both the input device and the output device may include fixed or removable storage media, such as a magnetic computer disk, CD-ROM, or other suitable media to both receive input from and provide output to users of the clients through the display, namely the GUI.

GUI comprises a graphical user interface operable to allow the user of the client to interface with at least a portion of the control system for any suitable purposes such as to allow the client to interact with the algorithms stored therein and/or one or more of the technologies disclosed herein. Generally, the GUI provides the client with an efficient and user-friendly presentation of data provided by or communicated within the system. The GUI may comprise a plurality of user interface (UI) elements such as interactive fields, pull-down lists, and buttons operable at the client. These UI elements may be associated with one or more of the technologies disclosed herein.

While the embodiments are described with reference to various implementations and exploitations, it will be understood that these embodiments are illustrative and that the scope of the inventions is not limited to them. Many variations, modifications, additions, and improvements are possible. Further still, any steps described herein may be carried out in any desired order, and any desired steps may be added or deleted. Support for the present invention may be found in the attached documents and figures, all of which are expressly incorporated herein in their entirety by reference thereto.

What is claimed is:

1. A system for monitoring zooplankton concentration, comprising:
   a culture reactor including culture water;
   a light source;
   a photodetector;
   at least one pump;
   a first sample of culture water taken from the culture reactor, the first sample of culture water including water and an unknown concentration of microalgae;
   a second sample of culture water taken from the culture reactor, the second sample of culture water including water and an unknown concentration of microalgae and zooplankton;
   a sample tube;
   a digital storage device; and
   a microprocessor in communication with the digital storage device,
   wherein the light source and the photodetector are positioned such that the photodetector detects the light emitted from the light source through the sample tube;
   wherein the at least one pump moves the first sample and the second sample into and out of the sample tube;
   wherein the photodetector outputs a first signal while the first sample is in the sample tube, and a second signal while the second sample is in the sample tube;
   wherein the digital storage device captures and stores a value for each of the first and second signals; and wherein the microprocessor calculates a concentration of zooplankton in the second sample by calculating a difference between the first signal and the second signal.

2. The system of claim 1, wherein the at least one pump is an airlift pump.

3. The system of claim 1, wherein the sample tube is a quartz tube.

4. The system of claim 1, wherein the light source is an LED light source.

5. The system of claim 1, wherein the light source and photodetector are a transmissiometer.

6. The system of claim 5, wherein the transmissiometer functions as a turbidity meter.

7. The system of claim 1, wherein the zooplankton are selected from one of Sub-Phylum Crustacea, order Cladoceran, Sub-Phylum Crustacea, sub-class Copepoda, and Brine shrimp.

8. The system of claim 1, wherein the photodetector is selected from one of a photoresistor, a photovoltaic cell, a photodiode, and a phototransistor.

9. A system for monitoring zooplankton concentration, comprising:
   a zooplankton culture;
   a light source;
   a photodetector;
   a digital storage device; and
   a microprocessor in communication with the digital storage device,
   wherein a sample is taken from the zooplankton culture, the sample including water and an unknown concentration of microalgae and zooplankton,
   wherein the light source and the photodetector are positioned such that the photodetector detects the light emitted from the light source after the light emitted passes through the sample,
   wherein the photodetector outputs a signal based on the light detected from the light source after it passed through the sample,
   wherein the digital storage device captures and stores a plurality of values of the signal,
   wherein the microprocessor estimates a concentration of zooplankton as a function of the rate of decrease of the signal over time across at least one feed cycle, wherein a single feed cycle is the time from the introduction of a first microalgae feed into the zooplankton culture and a second microalgae feed into the zooplankton culture.

10. The system of claim 9, wherein the pump is an airlift pump.

11. The system of claim 9, wherein the light source and photodetector are proximate to a quartz tube containing the sample.

12. The system of claim 9, wherein the light source is an LED light source.

13. The system of claim 9, wherein the light source and photodetector are a transmissiometer.

14. The system of claim 13, wherein the transmissiometer is a turbidity meter.

15. The system of claim 9, wherein the zooplankton are selected from one of Sub-Phylum Crustacea, order Cladoceran, Sub-Phylum Crustacea, sub-class Copepoda, and Brine shrimp.

16. The system of claim 9, wherein the photodetector is selected from one of a photoresistor, a photovoltaic cell, a photodiode, and a phototransistor.

* * * * *